US007948444B2

(12) United States Patent
Signell et al.

(10) Patent No.: US 7,948,444 B2
(45) Date of Patent: May 24, 2011

(54) METHOD AND SYSTEM OF COMMUNICATIONS FOR HIGH DATA RATE TRANSMISSION

(75) Inventors: Svante Signell, Vällingby (SE); Peter Larsson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1086 days.

(21) Appl. No.: 10/596,638

(22) PCT Filed: Dec. 21, 2004

(86) PCT No.: PCT/SE2004/001952
§ 371 (c)(1),
(2), (4) Date: Apr. 2, 2007

(87) PCT Pub. No.: WO2005/062427
PCT Pub. Date: Jul. 7, 2005

(65) Prior Publication Data
US 2008/0026697 A1    Jan. 31, 2008

(30) Foreign Application Priority Data

Dec. 22, 2003    (WO) ........................ PCT/SE03/02081

(51) Int. Cl.
*H01Q 21/00* (2006.01)
(52) U.S. Cl. .................. 343/844; 343/700 MS; 343/893
(58) Field of Classification Search ........... 343/700 MS, 343/844, 853, 893; 455/101, 132, 272
See application file for complete search history.

(56) References Cited

U.S. PATENT DOCUMENTS

| 6,323,823 | B1 * | 11/2001 | Wong et al. .................. 343/844 |
| 6,377,558 | B1 | 4/2002 | Dent |
| 6,456,244 | B1 * | 9/2002 | Goldstein et al. ...... 343/700 MS |
| 7,248,841 | B2 * | 7/2007 | Agee et al. ..................... 455/101 |
| 7,356,089 | B2 * | 4/2008 | Jia et al. ......................... 375/267 |

OTHER PUBLICATIONS

Kyritsi, P, "MIMO capacity in free space and above perfect ground: theory and experimental results" In: The 13$^{th}$ IEEE International Symposium on Personal, Indoor and Mobile Radio Communications, 2002. Sep. 15-18, 2002, vol. 1, pp. 182-186, INSPEC AN 7690963 see Chapter II and IV and Abstract, Introduction and Figures 1-2.

Driessen, P.F. et al. "On the capacity formula for multiple input multiple output wireless channels: a geometric interpretation" In: 1999 IEEE International Conference on Communications, 1999. ICC '99. Vancouver. BC, Canada, Jun. 6-10, 1999, vol. 3, pp. 1603-1607, INSPEC AN: 6460567, see Chapter II/A, Line-of-sight channels and Chapter I.

Hutter, A.A et al. "Analysis of MIMO capacity gains for indoor propagation channels with LOS component" In: The 13$^{th}$ IEEE International Symposium on Personal, Indoor and Mobile Radio Communications, 2002, Sep. 15-18, 2002, vol. 3. pp. 1337-1341—INSPEC AN: 7578098 see Abstract and Chapter III and Figures 2.3.

(Continued)

*Primary Examiner* — Tan Ho

(57) ABSTRACT

In a method and system for configuring an antenna for line of sight (LOS) communication procedures are implemented for providing low error rates at moderate transmission power. The antenna is configured for a particular communications distance over line of sight links providing multiple-input multiple-output communication links, including radio links and optical wireless communications links.

76 Claims, 11 Drawing Sheets

OTHER PUBLICATIONS

3rd AusCTW. Feb. 4-5, 2002 Ying Tan et al: "Spatial Characterization of Indoor Radio Channel Measurements at 2.5 GHZ" see Chapter III, Chapter I, Abstract and Figures 7.8 and Tables 1-4.

Sturzebecher, D et al. "MMIC antenna front end for optically distributed MMW antennas" In: IEEE MTT-S International Microwave Symposium Digest, 1995. Orlando, FL, USA, May 16-20, 1995, vol. 3, pp. 1107-1110. INSPEC AN: 5016593. see Introduction and Abstract.

* cited by examiner

Channel capacity per bandwidth [bits/Hz/s]

METHOD AND SYSTEM OF COMMUNICATIONS FOR HIGH DATA RATE TRANSMISSION

TECHNICAL FIELD OF THE INVENTION

The present invention relates to high data rate communications, and more especially it relates to line of sight, LOS, multiple input multiple output, MIMO, links, such as radio links and optical wireless communications links. For reasons of simplicity elements receiving or emitting electromagnetic fields are referred to as antenna elements as, e.g., light emitters and sensors are direct correspondences in light communications to antenna elements for radio wave communications.

BACKGROUND AND DESCRIPTION OF RELATED ART

High-speed wireline or fiber optic connections of backbone networks interconnecting nodes of a terrestrial radio access network are previously known. It is also known to interconnect radio base stations with microwave links providing interconnections of moderate data rates.

Increased antenna area of prior art microwave link antennas increases signal quality, but also increases irradiated microwave power as does transmission power increases. An increased antenna area can be achieved by arranging a plurality of smaller area antenna elements in an array.

Efficient modulations and signal constellations offer relieved power requirement, or improved performance if microwave power is maintained, as number of signal points in the signal constellation increases.

American Patent Application US2003/0125040 discloses a system for multiple-input multiple-output (MIMO) communication. A MIMO channel formed by $N_T$ transmit antennas and $N_R$ receive antennas is decomposed into $N_c$ independent channels also referred to as spatial sub-channels, where $N_c \leq \min\{N_T, N_R\}$. Data is processed prior to transmission based on channel state information.

American Patent Application US2002/0039884 reveals a radio communication system with a transmitter having a plurality of transmitter antennas and a receiver having at least one antenna. Thereby a plurality of paths with various characteristics are formed between the transmitter antennas and the at least one receiver antenna. Data is assigned one or more categories. Depending on categories and path characteristics, the data is mapped to one or more of the transmitter's parts and antennas.

American Patent Application US2002/0039884 describes a radio communication system with a transmitter having a plurality of transmitter antennas and a receiver having at least one antenna. Data tags indicate data importance or other requirements. Data is assigned one or more categories. Depending on categories and path characteristics, the data is mapped to one or more of the transmitter's parts and antennas.

$3^{rd}$ Generation Partnership Project (3GPP): *Technical Specification Group Radio Access Network, Physical layer aspects of UTRA High Speed Downlink Packet Access (Release 4)*, 3G TS 25.848 v 4.0.0, France, March 2001, describes MIMO open loop signal processing of MIMO transmitter and receiver in section 6.5.

*Bell Labs Technical Journal*, autumn 1996: G. Foschini, "*Layered Space-Time Architecture for Wireless Communication in a Fading Environment When Using Multi-Element Antennas*" shows that under fading conditions with statistically uncorrelated identically distributed propagation channels, the bandwidth constrained channel capacity of a MIMO channel, $C_{MIMO}$, scales on average as $$C_{SISO} \cdot \min\{M,N\}, \qquad (1)$$

where $C_{SISO}$ is channel capacity of a SISO channel, and M and N are number of antenna elements at receiver and transmitter side, respectively. For a band limited (bandwidth B) AWGN (Additive White Gaussian Noise) channel the SISO channel capacity equals $$C_{SISO}=B \cdot \log_2(1+SNR_{SISO}) \text{ [bits/s]}, \qquad (2)$$

where $SNR_{SISO}$ is the SISO channel signal to noise ratio.

FIG. 1 schematically illustrates N transmitter antenna elements $<<T_1, T_2, \ldots, T_N>>$ and M receiver antenna elements $<<R_1, R_2, \ldots, R_M>>$ in MIMO communications. Between the various transmitter and receiver antenna elements there are propagation channels $<<h_{11}, h_{12}, \ldots h_{1M}, \ldots, h_{NM}>>$.

The individual propagation channels, that are SISO (Single Input Single Output) channels, form a MIMO channel.

C. Schlegel and Z. Bagley, "*Efficient Processing for High-Capacity MIMO Channels*" submitted to JSAC, MIMO Systems Special Issue: Apr. 23, 2002 reveals estimation of optimum channel capacity of a MIMO system for a known MIMO-channel described by channel matrix H by means of singular value decomposition, SVD.

$$U \cdot S \cdot V^H = SVD\{H\}, \qquad (3)$$

where U and V are unitary matrices, S is a resulting diagonal matrix with singular values in the main diagonal, and $V^H$ is a Hermitian transformed matrix V.

A. Goldsmith, S. A. Jafar, N. Jindal, S. Vishwanath, "*Capacity Limits of MIMO Channels*" IEEE Journal on Sel. Areas in Comm., Vol. 21, No. 5, June 2003 provides results on capacity gain obtained from multiple antennas in relation to channel information at receiver or transmitter, channel signal-to-noise ratio, and correlation between channel gains of each antenna element. The paper also summarizes results for MIMO broadcast channel, BC, and multiple access channel, MAC, and discusses capacity results for multicell MIMO channels with base station cooperation, the base stations acting as a spatially diverse antenna array.

In accordance with Goldsmith et al., the MIMO channel capacity for flat fading channel conditions, in the case of equal number of antenna elements for transmitter and receiver antennas, is $$C_{MIMO} = B \cdot \log_2\left(det\left\{I + \frac{SNR}{N} H \cdot H^H\right\}\right) \text{ [bits/s]}, \qquad (4)$$

assuming uncorrelated channels of the various sending antenna elements.

P. Kyritsi, "*MIMO capacity in free space and above perfect ground: Theory and experimental results*" 13th IEEE International Symposium on Personal, Indoor and Mobile Radio Communications 2002, vol. 1, pp. 182-186, September 2002 studies the capacity potential for propagation in free space over perfect ground. Theoretical predictions are compared with measurements over an empty parking lot with nearly flat surface.

None of the cited documents above discloses particular antenna configurations related to communications distance with line of sight, LOS, MIMO communications.

SUMMARY OF THE INVENTION

Next generation radio access networks are expected to be required to support peak user data rates in the order of magnitude of 30 Mbps-1 Gbps. With a vast amount of base stations, it would be advantageous to interconnect base stations over radio links for flexibly connecting/disconnecting links of a mobile station active set of radio links with the base station as the mobile station moves.

Present radio link solutions do not offer sufficient data rates of aggregate user data, as to/from a base station, including a plurality of high rate user data links at reasonable power levels for reasonably sized element antenna apertures.

Consequently, there is a need of antennas of large apertures providing required data rates at reasonable transmission power for reasonably sized element antenna apertures.

It is consequently an object of the present invention to achieve an antenna configuration for line of sight communication useful for providing low error rates at moderate transmission power within limits as may be required by due authorities.

It is also an object to achieve a system flexible to different transmission ranges and wavelength ranges.

An object is also to offer high data rates for low transmission power levels as regards antenna properties.

Another object is to achieve an antenna configuration adapted to particular communications distance and wavelength.

Finally, it is an object to relieve the dependency on tangible interconnections, such as wire lines or optical fibers, for interconnection of base stations or other nodes of a telecommunications system. Such interconnections are generally associated with great initial investment costs and maintenance costs.

These objects are met by a method and system of antennas configured for a particular communications distance over line of sight links providing multiple input multiple output communications links.

DESCRIPTION OF PREFERRED EMBODIMENTS

In backbone networks based on wireless communications it is important to achieve capacity to handle data rates of aggregate traffic, where individual peak user data rates are in the order of 100 Mbps to 1 Gbps.

Fixed fiber optical networks are not always applicable. They are often associated with great costs, provide little or no flexibility and occupy extensive ground space.

Prior art Multiple Input Multiple Output, MIMO, communications systems most commonly are designed to utilize scattering and, therefore, requires a scattering environment.

The present invention is not dependent on such scatterers and suits line of sight communication very well. A theoretical reason for this is its exploitation of spherical wave fronts and associated phase differences.

Figure 1:
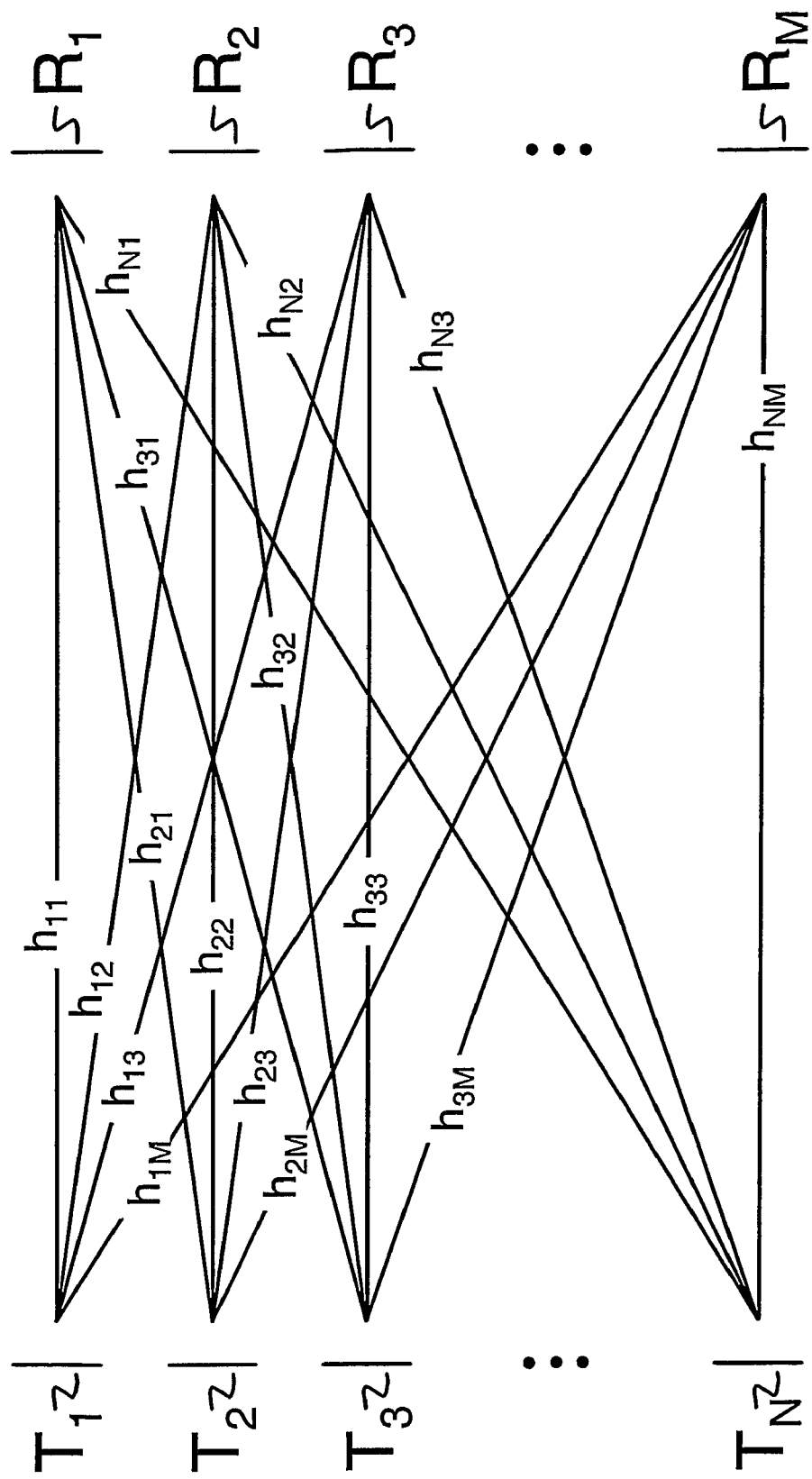
FIG. 1 schematically illustrates N transmitter antenna elements and M receiver antenna elements in MIMO communications.
Figure 2:
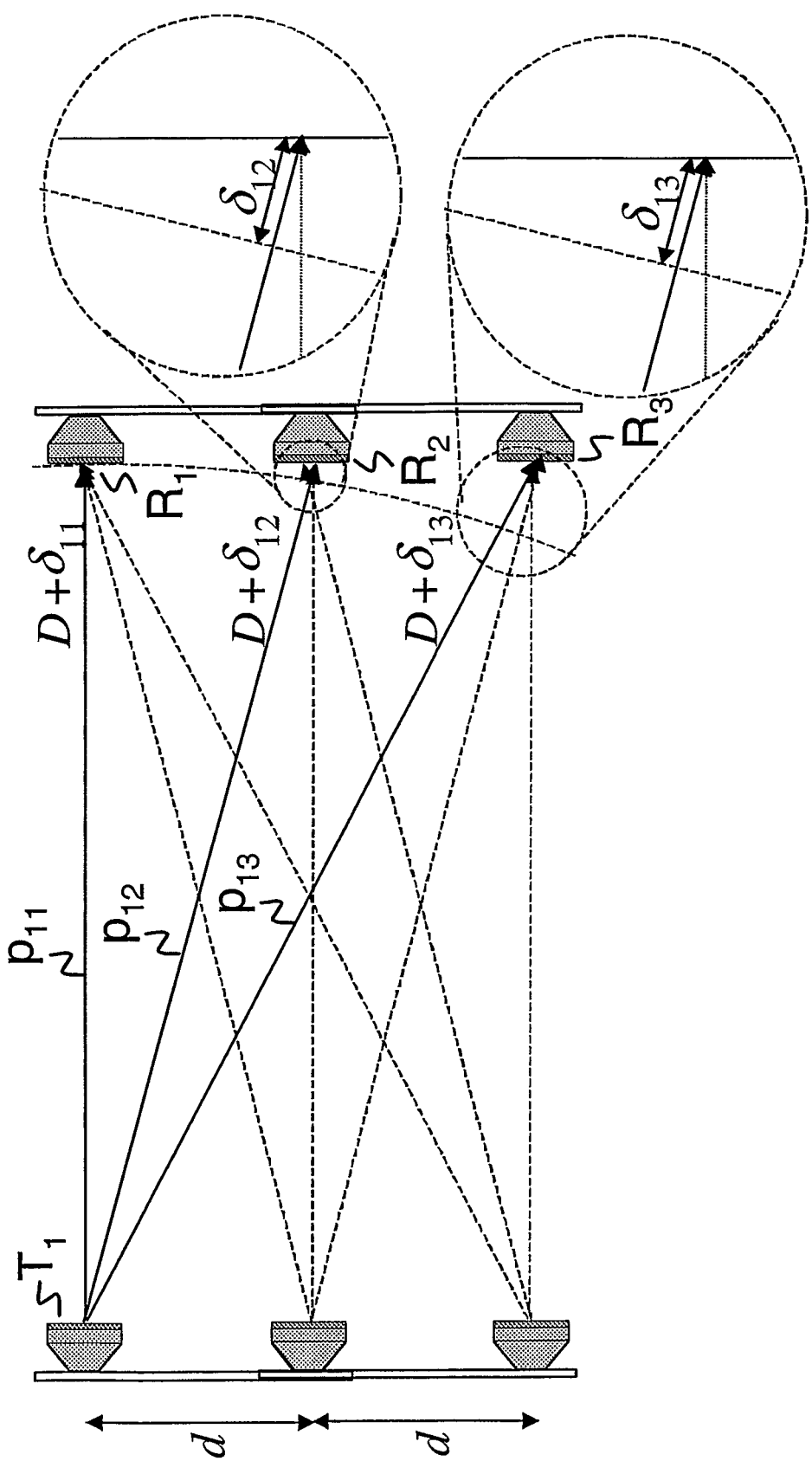
FIG. 2 schematically illustrates a spherical wave-front background to the invention.

FIG. 2 schematically illustrates propagation paths and principles of the invention. Respective propagation paths $<<p_{11}>>$, $<<p_{12}>>$, $<<p_{13}>>$ between a transmitter antenna $<<T1>>$ and receiver antennas $<<R_1>>$, $<<R_2>>$, $<<R_3>>$ differ slightly in length due to a spherical wave front property of the transmitted signal. The small differences in path lengths $<<\delta_{11}>>$, $<<\delta_{12}>>$, $<<\delta_{13}>>$ add to the communications distance D. With path $p_{ij}$ as a reference for the communications distance, $\delta_{ij}$ equals zero. I.e. when $p_{11}$ is selected as reference then $\delta_{11}=0$. The antenna configuration according to the invention essentially maximizes MIMO channel capacity for great signal to noise ratios, SNR, in respect of the spherical wave front property for LOS communications. This is in contrast to, e.g., maximizing antenna directivity as illustrated in and explained in relation to FIG. 14 below.

With each MIMO sub-channel operating close to its maximum theoretical performance, according to the configuration of the invention, great performance gains are achieved.

Figure 3:
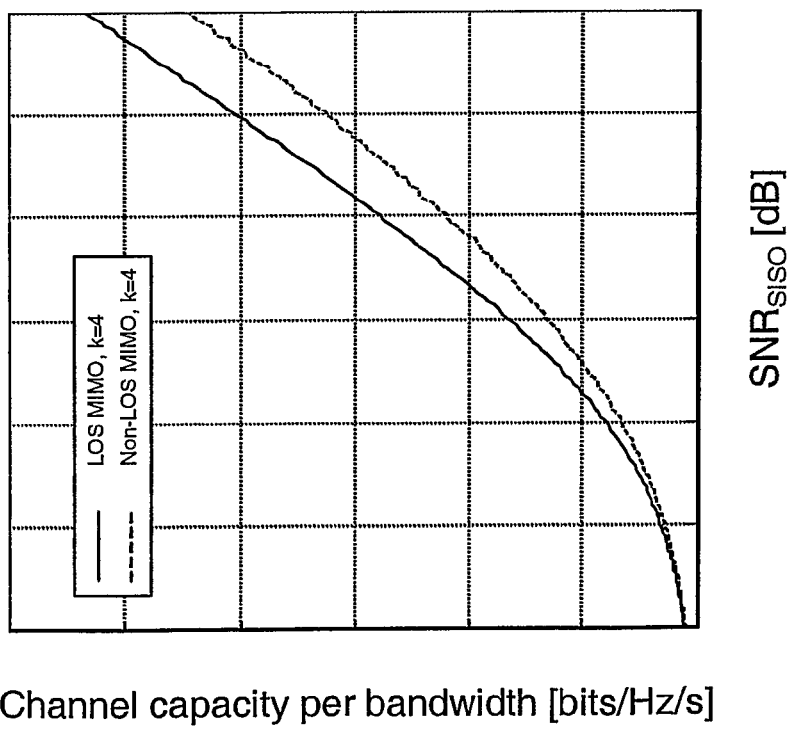
FIG. 3 illustrates example capacity versus $SNR_{SISO}$ for four-element LOS MIMO linear array, according to the invention, and four-element linear array non-LOS MIMO.

FIG. 3 illustrates example capacity versus $SNR_{SISO}$ for LOS MIMO and non-LOS MIMO (fading uncorrelated channels) for a four-element linear array. For the comparison illustrated in FIG. 3, non-LOS MIMO array antenna elements are assumed to be placed such that the antenna elements experience channels with no or negligible cross correlation. In a typical local scattering environment, this is achieved by placing the antenna elements separated by half a wave-length.

The illustrated capacity of LOS MIMO is achieved for a system according to the invention. The gain of LOS MIMO as compared to non-LOS MIMO in terms of capacity increase or SNR gain is the vertical or horizontal difference between the curves, respectively. The SNR gain implies, e.g., increased noise immunity or reduced transmission power requirement.

Radio Access Networks, RANs, are frequently realized with base stations connected in series, with at least one of the serialized base stations serving as an anchor to the core network. Consequently, the individual links between base stations may carry data traffic of a plurality of base stations. With individual peak user data-rates in the range of 100 Mbps-1 Gbps required peak rates of data links between base stations could be expected to be in the range of 1-100 Gbps.

Prior art radio data links is not known to provide data rates of more than one Gbps for the spectrum efficiency achieved with the invention. The major two reasons for this are that there are practical limits on signal constellation sizes, practical and regulatory constraints on available radio spectrum, and power limits.

Figure 8:
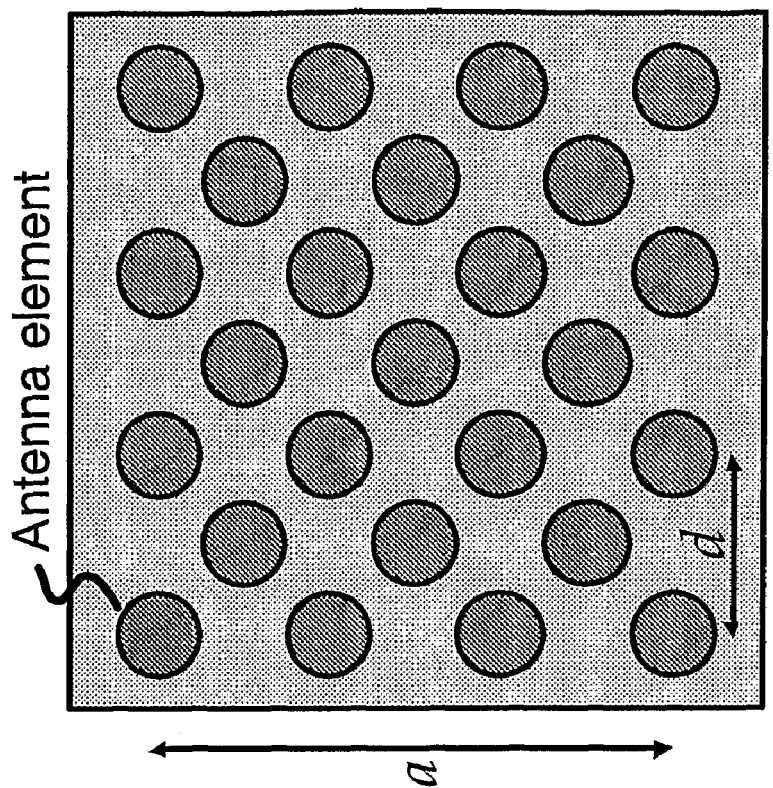
FIG. 8 depicts a spatially oversampled antenna array, according to the invention.
Figure 10:
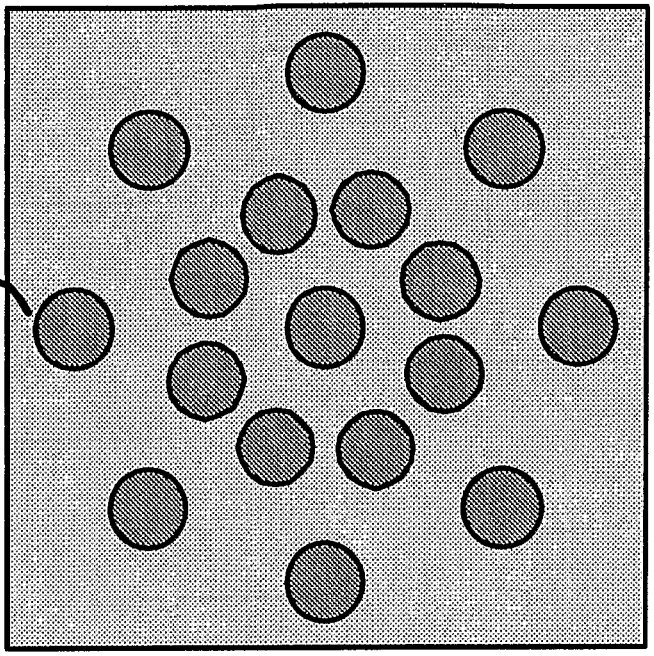
FIG. 10 has an antenna array with circular element packing, according to the invention.
Figure 9:
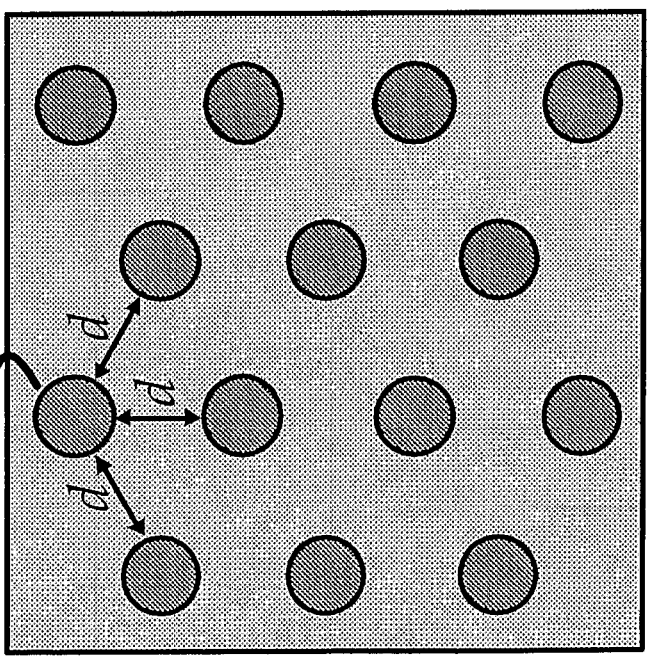
FIG. 9 demonstrates hexagonal antenna element packing, according to the invention.
Figure 12:
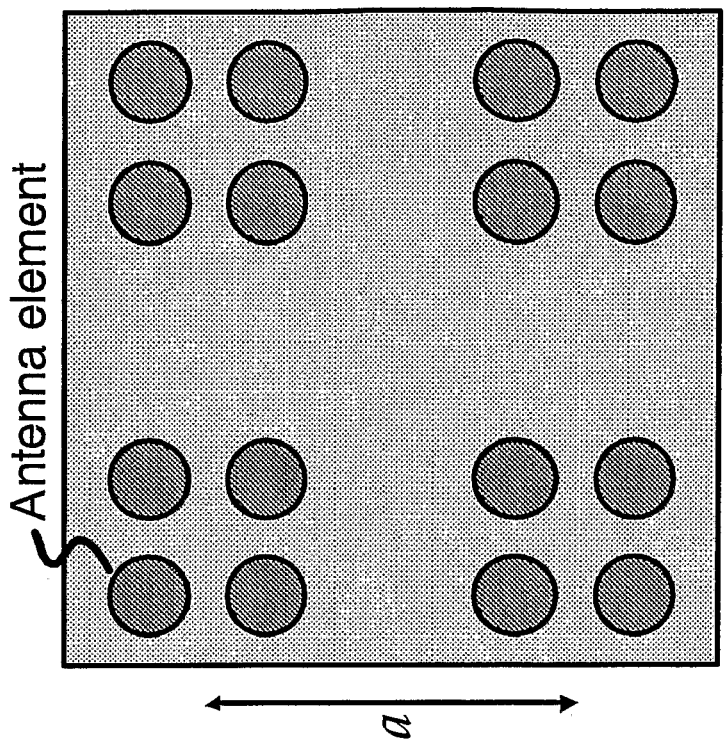
FIG. 12 shows a clustered directional hybrid with four groups of clustered antenna elements for four channels MIMO, according to the invention.
Figure 13:
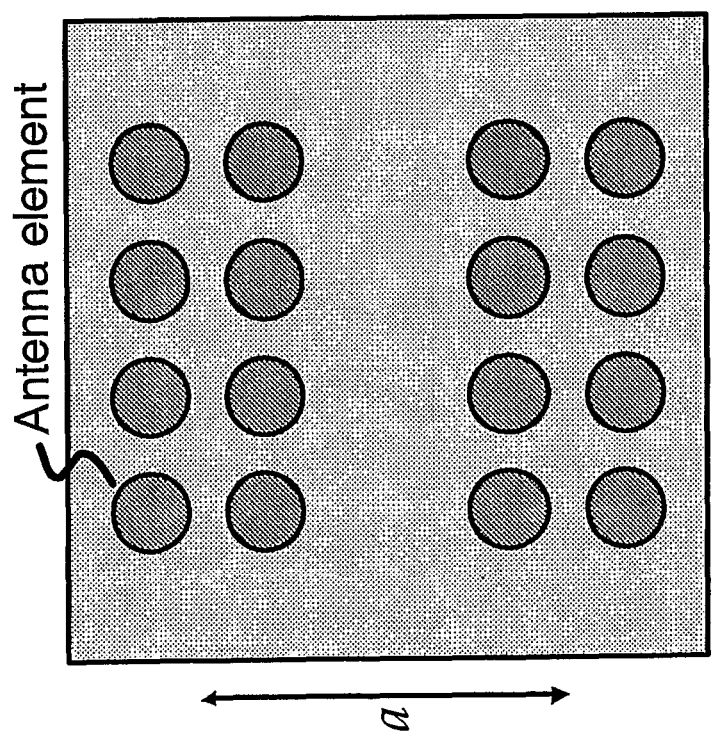
FIG. 13 illustrates a clustered directional hybrid with two groups of clustered antenna elements for two channels MIMO, according to the invention.

Prior art relies upon uncorrelated channels between the various antenna elements. This could e.g. be the case for channels fading due to scattering. The presumption, however, normally does not hold for LOS communications over wireless links, such as e.g. radio links. However, the invention points out that exploitation of the spherical property of wave fronts results in ideal MIMO gain in absence of scatterers. According to the invention rectangular or square grid LOS MIMO antenna array and linear LOS MIMO antenna arrays are preferred, see FIGS. 4 and 6 respectively. This does not exclude circular or hexagonal packing as a means to increase antenna elements surface density as illustrated in FIGS. 9 and 10 respectively. In the hexagonal packing of FIG. 9 the respective distances between (at most 6) nearest neighboring antenna elements <<Antenna element>> are all essentially equal <<d>>. Spatially oversampled and clustered antenna arrays, see FIGS. 8 and 11 respectively, are preferred for some situations. FIGS. 12 and 13 show some other clustered directional hybrids for 16 antenna elements <<Antenna element>>.

Figure 11:
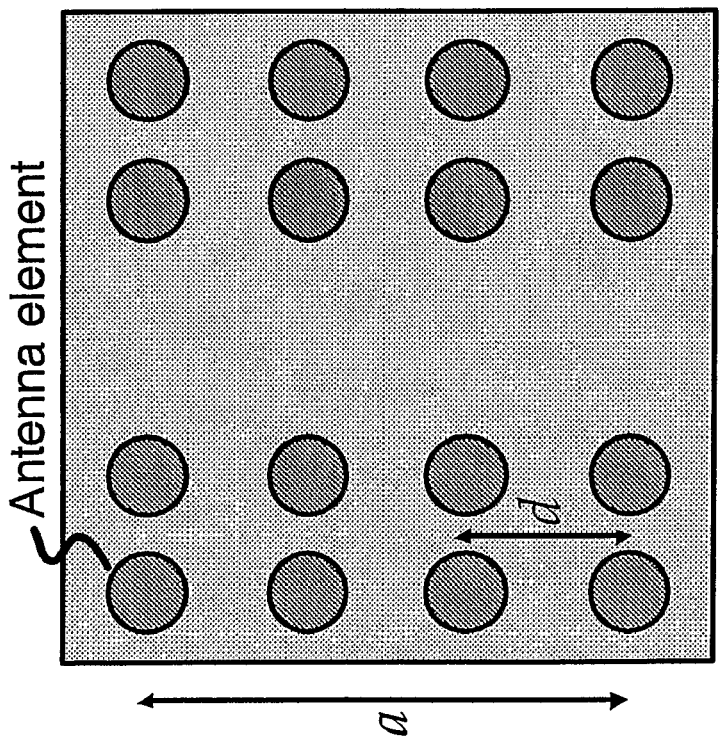
FIG. 11 displays a clustered directional hybrid with eight groups of clustered antenna elements for eight channels MIMO, according to the invention.

With reference to FIGS. 11-13, while the total number of antenna elements, N, are kept constant equal to 16 elements the respective number of groups of elements, k ($1 \leq k \leq N$), of the figures varies. In FIG. 11 there are eight groups with two antenna elements <<Antenna element>> each. Within each group the antenna elements <<Antenna element>> are positioned sufficiently close for signals to add coherently in phase, thereby generating a directivity gain. FIG. 13 illustrates an example realization with four groups, each of four antenna elements <<Antenna element>>. In FIG. 13, an example for N=16 and k=2 is illustrated. In the figures each group of antenna elements <<Antenna element>> generates a MIMO sub-channel. With N/k antenna elements for each MIMO sub-channel on receiver and transmitter side, the total achievable gain is $(N/k)^2$, since both sides contribute to the gain. If equivalent isotropic radiated power, EIRP, is at its maximum level allowed, the gain at transmitter side is achieved as a reduction of transmit power and not in increased received power or energy per symbol. Assuming an SNR gain of $(N/k)^2$ for grouped directional antennas with k groups, equations (1) and (2) transform into $$C_{clustered} = B \cdot k \cdot \log_2\left(1 + \frac{N^2}{k^2} SNR_{SISO}\right) \text{ [bits/s]}. \quad (5)$$

Figure 14:
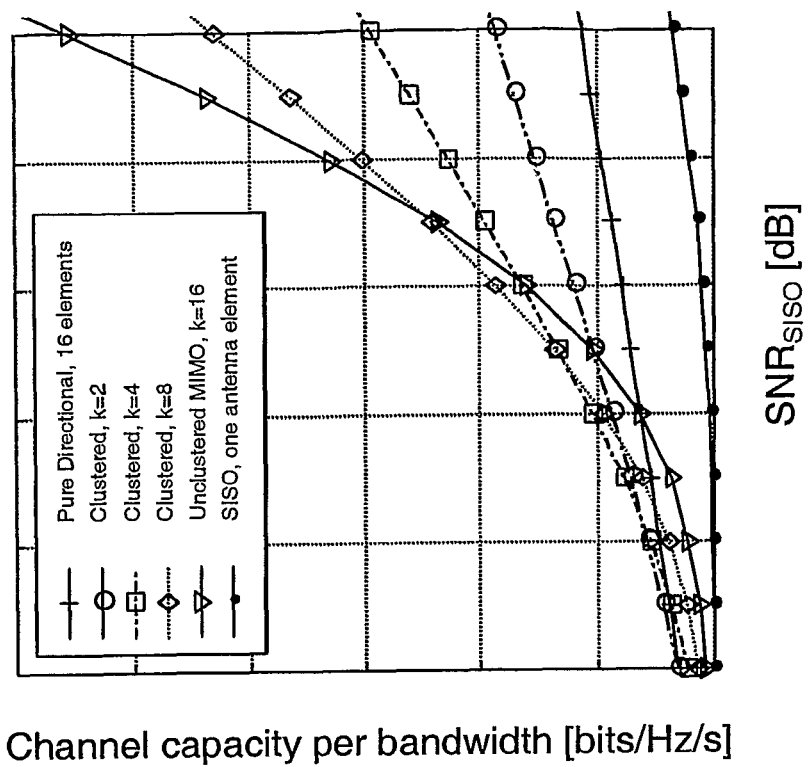
FIG. 14 comprises plotted capacity per bandwidth vs. normalized SNR for MIMO communications with square grid LOS MIMO antennas for various levels of clustering at both receiver and transmitter side, according to the invention.

There are SNR ranges where MIMO communications with clustered elements antennas outperform MIMO with the same number of antenna elements, not being clustered. As noted in FIG. 14 a channel capacity increase is achieved with clustering particularly for poor transmission conditions (small SNR). FIG. 14, plots the channel capacity per bandwidth $C_{clustered}/B$ for MIMO communications with clustered antenna elements versus SNR <<$SNR_{SISO}$>> normalized to SISO communications conditions, and where k is the number of clusters of antenna elements at transmitter and receiver ends, $k \in [1,N]$. The figure illustrates performance for an example of 16 antenna elements according to equation (5), with SISO performance of N=1 antenna element antennas included for reference.

Typically high SNR conditions prevail in short range communications. Consequently, gain increase by unclustered MIMO communications with great number of antenna elements is preferred for short-range communications.

For high SNR, the MIMO channel capacity in (4) is approximate to $$C_{MIMO} = f(|\text{Det}\{H\}|^2) \text{ [bits/s]}, \quad (6)$$

where f is a monotonically increasing function of one variable and $|\cdot|$ denotes absolute value. (Equations (4) and (6) turn out to be maximized by the same maximizing channel matrix, $H=H^{opt}$.) The inventors observe that the channel matrix H can be separated into a Kronecker product of two matrices, $H_v$ and $H_h$.

$$H = H_v \otimes H_h, \quad (7)$$

where $H_v$ is of dimension $N_v \times N_v$ and $H_v$ is of dimension $N_h \times N_h$, $N_v$ being the number of vertical antenna elements and $N_h$ being the number of horizontal antenna elements. The determinant in equation (6) then rewrites $$|\text{Det}\{H\}| = |\text{Det}\{H_v\}|^{N_h} \cdot |\text{Det}\{H_h\}|^{N_v}. \quad (8)$$

A further observation according to the invention is that each of $H_v$ and $H_h$ can be separated $$H_v = H_{v1} \cdot H_{v12} \cdot H_{v2}, \quad (9)$$

$$H_h = H_{h1} \cdot H_{h12} \cdot H_{h2}, \quad (10)$$

where the determinants $$\det\{H_{v1}\} = \det\{H_{v2}\} = 1, \quad (11)$$

$$\det\{H_{h1}\} = \det\{H_{h2}\} = 1, \quad (12)$$

and that the matrices $H_{v12}$ and $H_{h12}$ are Vandermonde matrices. In a final step of observing it is noted that $$\det\{H_{v12}\} \leq (N_v)^{N_v/2}, \quad (13)$$

$$\det\{H_{h12}\} \leq (N_h)^{N_h/2}. \quad (14)$$

In equations (13) and (14), the maximum is attained for vertical and horizontal distances $d_v$ and $d_h$, respectively, $$d_v = \sqrt{\frac{D\lambda}{N_v}}, \text{ and} \quad (15)$$

$$d_h = \sqrt{\frac{D\lambda}{N_h}}. \qquad (16)$$

For a generalized rectangular grid array with $N_h$ elements in each row and $N_v$ elements in each column, communicating at a frequency corresponding to wavelength $\lambda$ over a communications distance D, the optimum antenna elements distances in equation (15) and (16) converts to antenna dimensions equal to $$h = (N_v - 1)\sqrt{\frac{D\lambda}{N_v}}, \text{ and} \qquad (17)$$

$$w = (N_h - 1)\sqrt{\frac{D\lambda}{N_h}}. \qquad (18)$$

Figure 5:
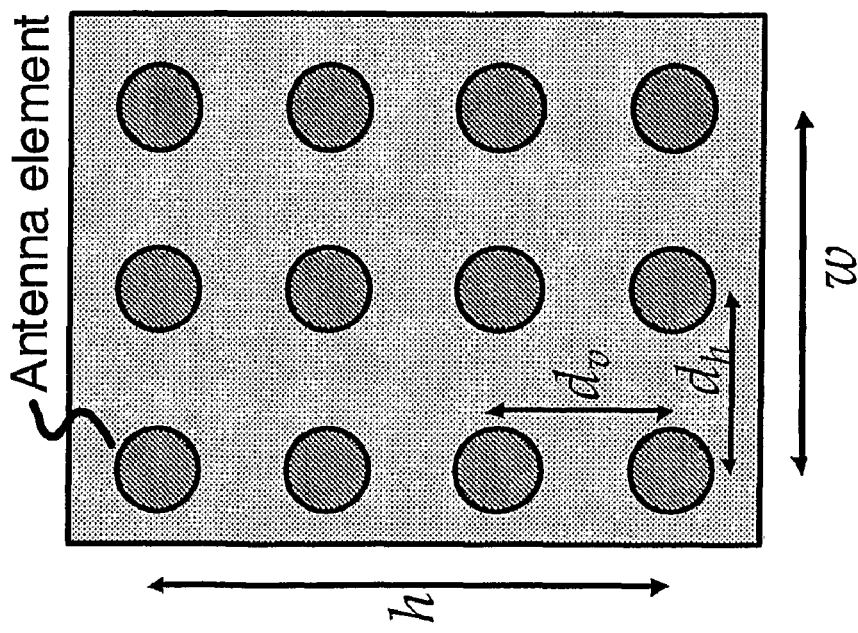
FIG. 5 illustrates an example rectangular array with four rows and three columns of elements according to the invention.

FIG. 5 illustrates an example rectangular array with four rows and three columns of elements, each row comprising antenna elements separated a distance $d_h$, and each column comprising antenna elements separated distance $d_v$. According to the invention the preferred antenna element distances are determined in accordance with equations (15) and (16). The dimension (Width×Height) of the antenna array is then $w^{opt} \times h^{opt}$.

Figure 6:
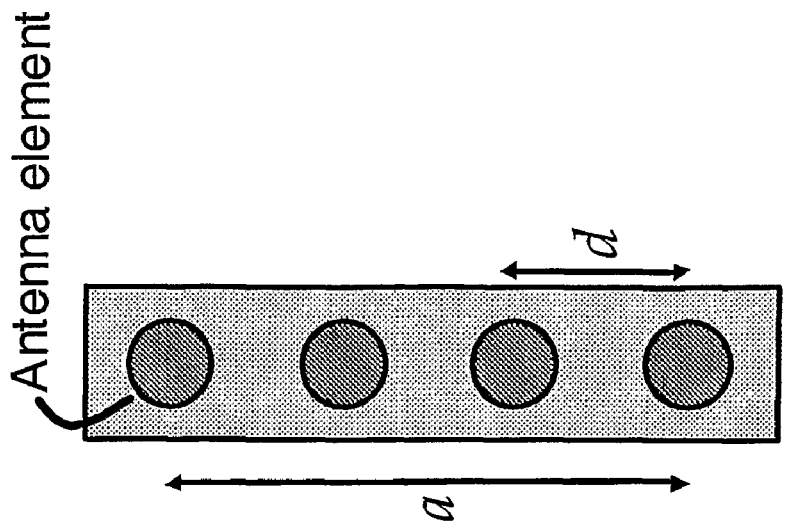
FIG. 6 shows a linear LOS MIMO antenna array, according to the invention.

In FIG. 6, for an optimum MIMO system and for a communications distance D much greater than element separation d the distance $a=d(N-1)$ is specified by $$a = (N - 1)\sqrt{\frac{D\lambda}{N}} \qquad (19)$$

$$\approx \sqrt{D\lambda N}, \qquad (20)$$

where the approximation in equation (20) holds for great number of antenna elements N. For N=16 antenna elements <<Antenna element>>, the approximation error is about 7%. Table 1 illustrates element separation, d, of a transmitter-receiver pair of linear MIMO antennas versus communications distance, D, at some example wavelengths, $\lambda$, equal to 3 mm, 7.9 mm and 42.9 mm.

TABLE 1

| Linear MIMO antenna, N = 2. | | | |
|---|---|---|---|
| Distance D | Element separation d [m] | | |
| [km] | $\lambda = 3$ mm | $\lambda = 7.9$ mm | $\lambda = 42.9$ mm |
| 0.2 | 0.55 | 0.9 | 2.1 |
| 2 | 1.7 | 2.8 | 6.5 |
| 20 | 5.5 | 8.9 | 20.7 |
| 200 | 17.3 | 28.1 | 65.4 |

Figure 4:
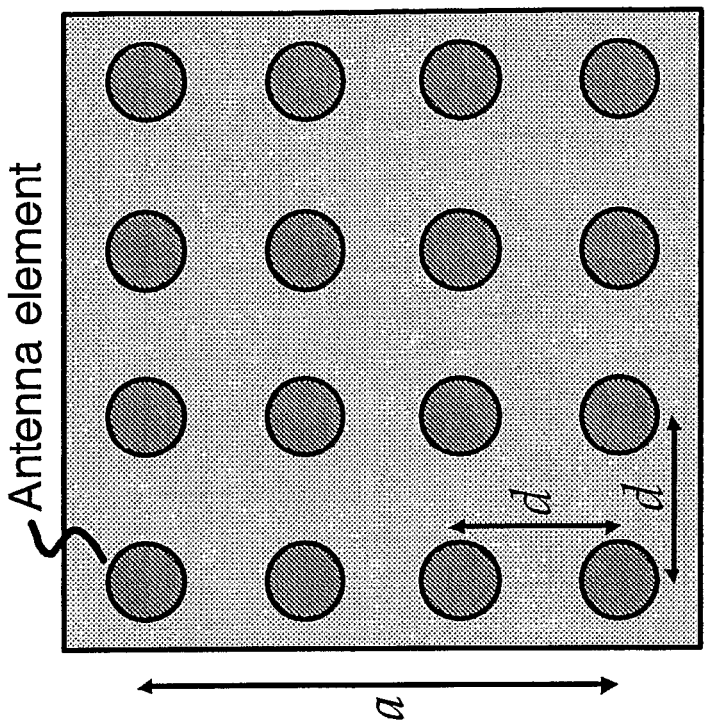
FIG. 4 illustrates a square grid LOS MIMO antenna array, according to the invention.

For the square grid LOS MIMO antenna array in FIG. 4, the distance a, corresponding to that of equation (19) for linear arrays, is determined to $a=(\sqrt{N}-1)d$ $$a = (\sqrt{N} - 1)\frac{\sqrt{D\lambda}}{\sqrt[4]{N}} \qquad (21)$$

$$\approx \sqrt{D\lambda} \cdot \sqrt[4]{N}, \qquad (22)$$

where the approximation in equation (22) holds for great number of antenna elements N. For N=16 antenna elements <<Antenna element>>, the approximation error is about 33%. An important observation is that for the square grid LOS MIMO antenna array in FIG. 4 the distances a and d get relatively smaller in proportion to the fourth root of N, whereas for the linear array of FIG. 6 the distance dependency is proportional to the square root of N.

With the antenna area $A=a^2$, and using the approximation in equation (22), the MIMO channel capacity, $C_{MIMO}=N \cdot C_{SISO}$, expressed in terms of channel capacity for a SISO system, $C_{SISO}$, with the example design of FIG. 4 according to the invention is $$C_{MIMO} \approx \left(\frac{A}{D\lambda}\right)^2 C_{SISO} \qquad (23)$$

In FIG. 4 and equation (21) the antenna elements <<Antenna element>> are assumed to be electrically active elements, supplying a voltage or current to a receiver. However, as illustrated below basically the same distance relations hold for antenna elements being directors guiding received electromagnetic field to electrically active antenna elements.

Figure 7:
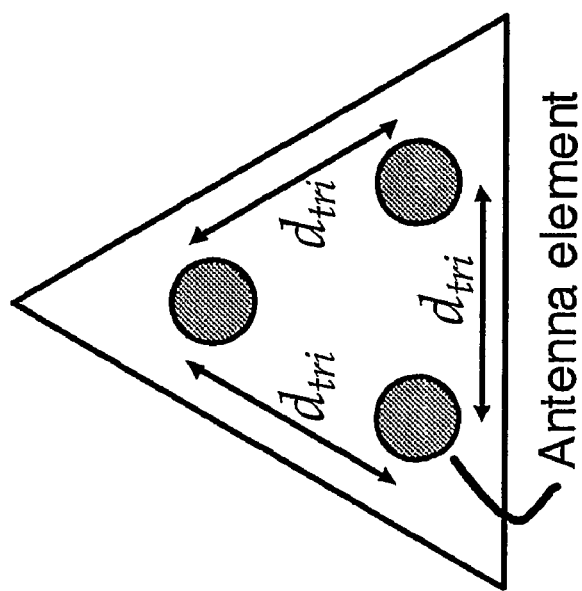
FIG. 7 illustrates an equilateral triangular antenna realization according to an embodiment of the invention.

FIG. 7 illustrates an equilateral triangular antenna realization according to an embodiment of the invention. The antenna elements are all separated by $d_{tri}$. Similarly to the rectangular realization in FIG. 5, the optimum antenna element separation of the equilateral triangular antenna structure with three antenna elements equals $\sqrt{D\lambda/3}$, where D is communication distance and $\lambda$ is communication wavelength.

Figure 15:
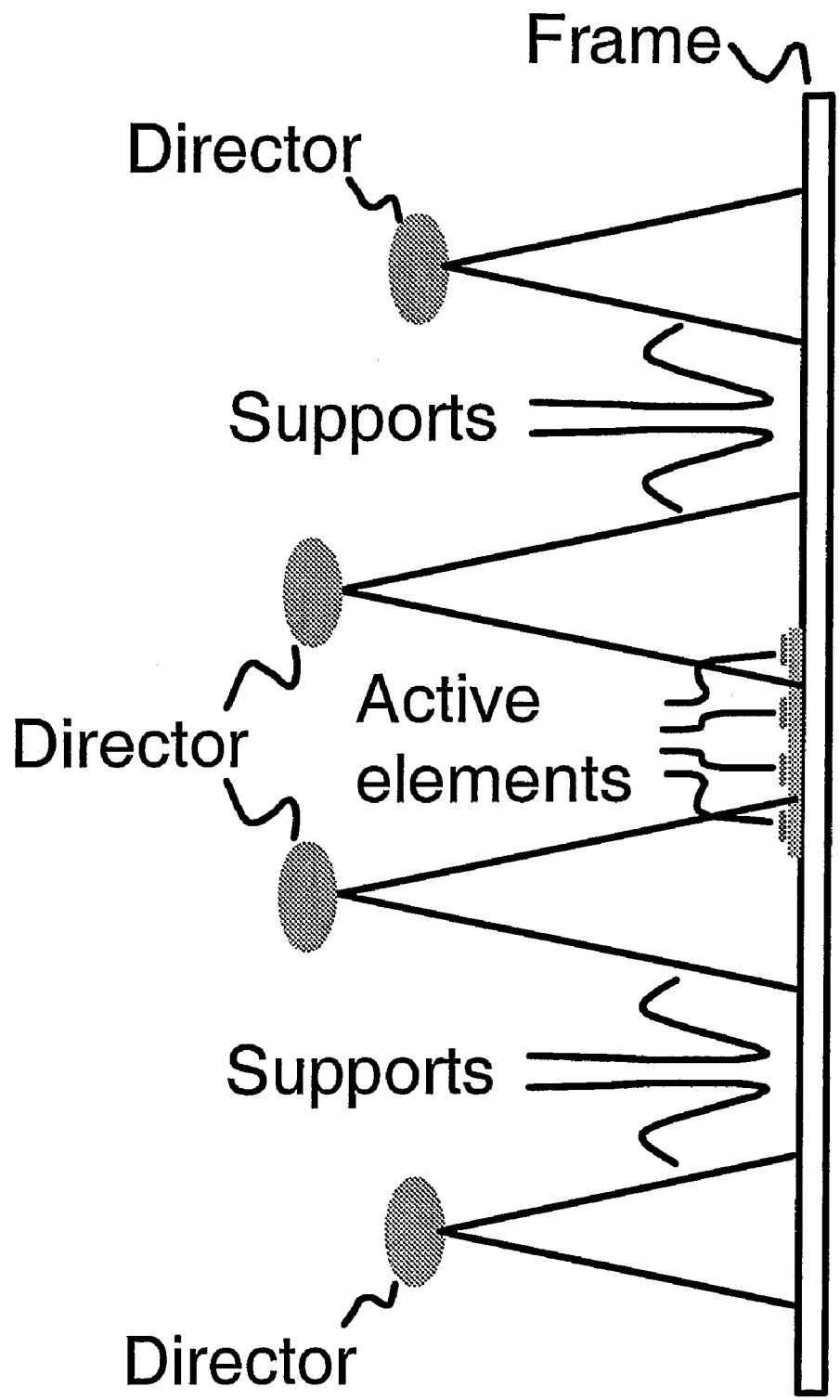
FIG. 15 shows an LOS MIMO antenna array with director elements, according to the invention.

FIG. 15 illustrates a realization with director elements <<Director>> mounted on supports <<Supports>>. The directors <<Director>> direct electromagnetic fields received and electromagnetic fields to be transmitted, preferably with one director per electrically active antenna element <<Active elements>>. Preferably the directors <<Director>> are pure reflectors but can also be made of dielectric material. The supports <<Supports>> are designed not to shadow, or only have a small shadowing impact on, the electrically active antenna elements <<Active elements>>. The positioning of the directors is preferably in accordance with equation (19) and (21) for a linear and square grid LOS MIMO antenna respectively. The relevant distance d is essentially equal to the separation distance of the projection of the directors onto a plane, the plane being perpendicular to the LOS transmission path to the other receiver/transmitter end. Advantages achieved by the realization of FIG. 15 in addition to those mentioned above are, e.g., simplified wiring of the antenna elements and the antenna elements spanning a smaller distance range thereby being mechanically robust. Also, by adjusting the directors the electrically active antenna elements need not always be repositioned even if communications distance changes.

Figure 16:
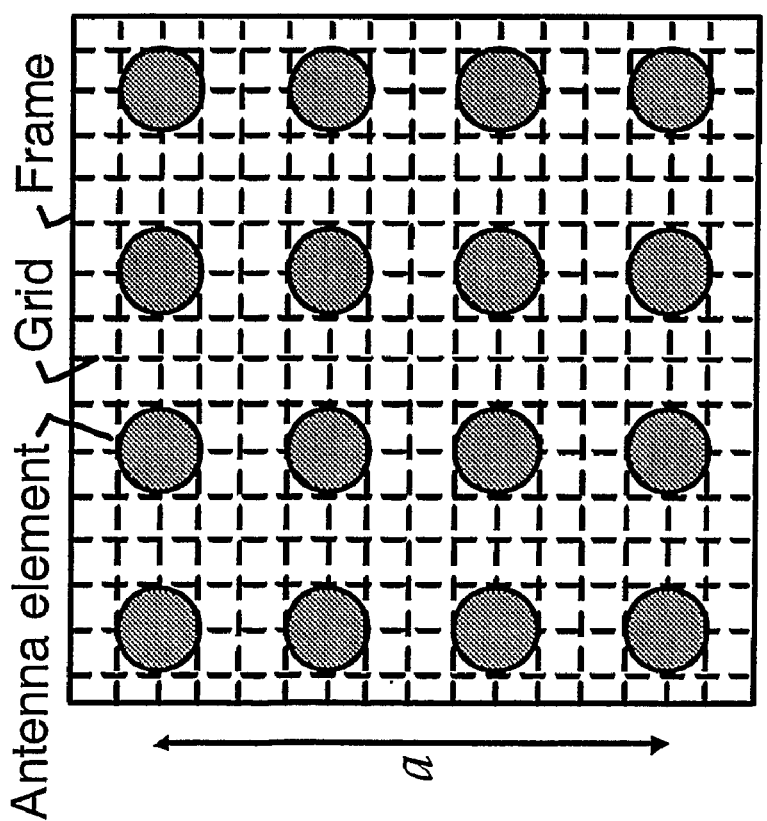
FIG. 16 depicts schematically an LOS MIMO antenna with a grid of interconnected rods or tensed wires to which the antenna elements are attached, according to the invention.

The dependency of a, A and $d_v/d_h/d$ on D for an LOS MIMO antenna has practical implications, addressed by the invention. An obvious solution to the problem of getting a, to the communications distance D, appropriately matched element distance, $d_v$, $d_h$, d, is to manufacture custom-made antennas. From a cost perspective, however, a more attractive solution is manufacturing of a Set of antenna models for MIMO communications, each designed for a range of communications distances D, and upon installation selecting an antenna model within the set that best matches the communications distance. For frequency non-selective channels, SVD (singular value decomposition) provides robustness and close to optimum performance also with non-perfect matching of communications distance, D, and element separation, $d_v$, $d_h$, d. Another embodiment is realized by individually adjustable antenna elements. Preferably this is realized by a grid <<Grid>> of interconnected rods or tensed wires to which the antenna elements <<Antenna element>> are attached as illustrated in FIG. 16. The wires or rods are preferably connected to a frame <<Frame>>. Models that are electromechanically adjustable comprise electromechanical motors to which the rods are connected, such that the rods to which the antenna elements <<Antenna element>> are attached may move along the frame. A further embodiment of adapting an LOS MIMO antenna to communications distance D uses spatial oversampled antennas as schematically illustrated in FIG. 8 and activating the antenna elements by signal processing providing best performance at actual communications distance. The particular element distribution may be varied, e.g. as illustrated in FIGS. 9 and 10. An important issue of the invention is that active elements are distributed such that their mutual distances reflects communications distance (distance between transmit and receive antennas) and wavelength such that the spherical properties of the radio wave can be exploited.

It is observed that as transmitter and receiver antennas form an antenna pair for a communications link, the respective element distances $d_v$, $d_h$ and d in e.g. equations (15) and (16) of an example transmitter antenna can be reduced (or increased) if the element distance of a corresponding example receiver antenna of the communications link is increased (or reduced) in proportion to the distance reductions (or increase) of the transmitter antenna. Indexing distances of transmitter and receiver antennas by T and R, respectively, if respective element distances of a receiver antenna, $d_{vR}$, $d_{hR}$ and $d_R$, are reduced (or increased) in relation to an initially determined distance $d_v$, $d_h$ or d, transmitter-side antenna-element distance, $d_{vT}$, $d_{hT}$ and $d_T$, should be increased (or reduced) in proportion thereto (in relation to $d_v$, $d_h$ and d). Consequently, the distances $d_v$, $d_h$ in equations (15) and (16) are the geometrical averages of receiver and transmitter antenna element distances, respectively.

The actual antenna dimensions in equations (17) and (18), of course, are determined by actual respective vertical and horizontal element distances. Correspondingly, also antenna dimensioning in equations (19) and (21) are determined by actual distances, if adjusted as described above. At transmitter side equations (17), (18), (19) and (21) translate to equations (24), (25), (26) and (27)

$$h_T=(N_{vT}-1)d_{vT}, \quad (24)$$

$$w_T=(N_{hT}-1)d_{hT}, \quad (25)$$

$$a_T=(N_T-1)d_T, \text{ and} \quad (26)$$

$$a_T=(\sqrt{N_T}-1)d_T, \quad (27)$$

and correspondingly for receiver side, they translate to equations (28), (29), (30) and (31)

$$h_R=(N_{vR}-1)d_{vR}, \quad (28)$$

$$w_R=(N_{hR}-1)d_{hR}, \quad (29)$$

$$a_R=(N_R-1)d_R, \text{ and} \quad (30)$$

$$a_R=(\sqrt{N_R}-1)d_r, \quad (31)$$

where $$d_v=\sqrt{d_{vR} \cdot d_{vT}}, \quad (32)$$

$$d_h=\sqrt{d_{hR} \cdot d_{hT}}, \quad (33)$$

$$d=\sqrt{d_R \cdot d_T}. \quad (34)$$

Figure 17:
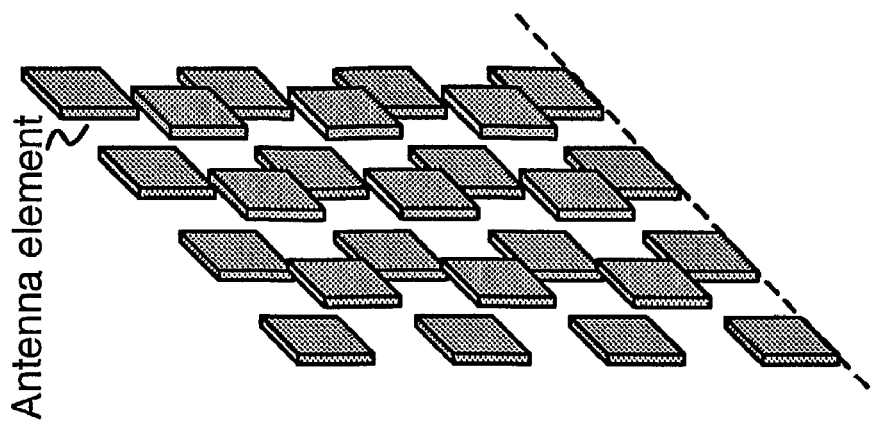
FIG. 17 illustrates a two-layer square grid LOS MIMO antenna with two layers of antenna elements each on a square grid.
Figure 19:
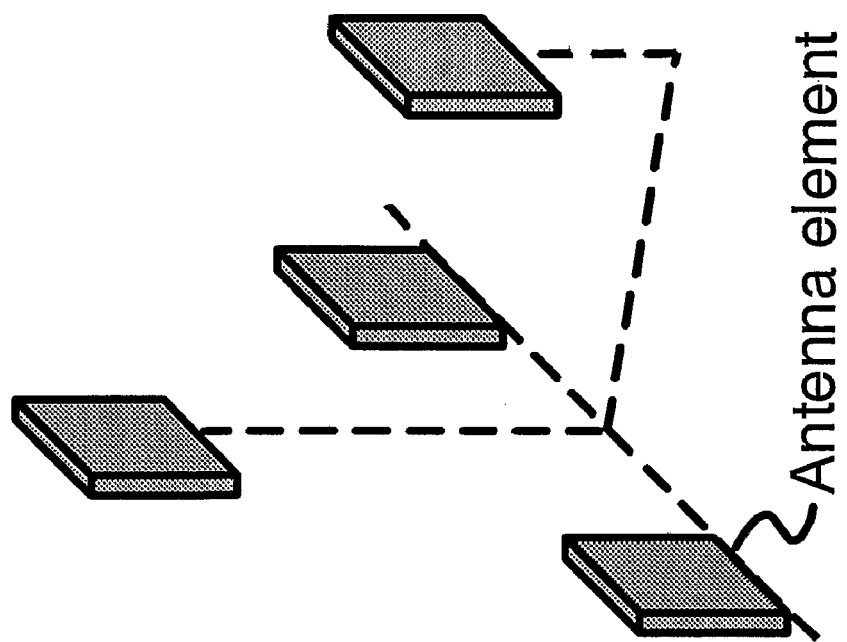
FIG. 19 illustrates a realization according to the invention with equal distances between all nearest neighboring antenna elements, the antenna elements being positioned to the vertices of a tetrahedron.
Figure 18:
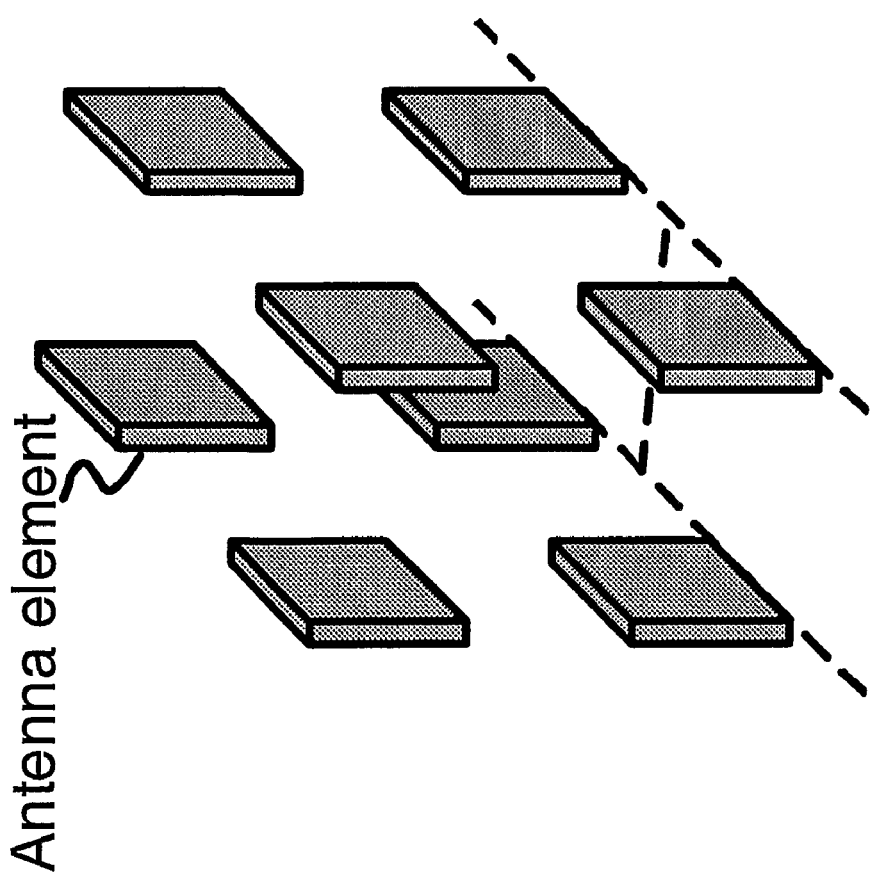
FIG. 18 illustrates a realization according to the invention with equal distances between all nearest neighboring antenna elements, the antenna elements being positioned to the vertices of a cube.

The invention does not only cover planar antenna configurations, but also three-dimensional configurations as illustrated in FIGS. 17-19. FIG. 17 illustrates a two-layer square grid LOS MIMO antenna with two layers of antenna elements each on a square grid. FIGS. 18 and 19 illustrate realizations with equal distance between all nearest neighboring antenna elements. In FIG. 18 the antenna elements are positioned to the vertices of a cube and in FIG. 19 the antenna elements are positioned to the vertices of a tetrahedron.

Various embodiments of the invention also cover different realizations of signal processing at transmitter and receiver ends. The processing is necessary for adaptation to prevalent channel conditions. At receiver or transmit side, determining channel singular values as described in relation to equation (3) and singular value decomposition can be achieved by digital signal processing of base band signals. If determined at transmitter side, information on channel matrix, H, need to be transferred from receiver side, or the channel matrix otherwise estimated at transmitter side, see figure. For a 2×2 channel matrix, singular value decomposition can also be achieved by a 3-dB hybrid to perform multiplication or weighting as need be, operating on high-frequency signals. Also, for channel matrices greater than 2×2 a generalization of a 3-dB hybrid, a Butler matrix directional coupler, may be used. A further embodiment realizes the processing by means of an arrangement of microstrip or waveguides, also operating on high-frequency signals. At receiver side, channel equalization requires processing. This processing can be performed by any of the processing realizations described for transmitter side, or received signal can be equalized by means of zero forcing, for which the received signal being multiplied by the inverse matrix of channel matrix H, or by means of minimum mean square error, MMSE, for which the mean square error is minimized, the various processing realizations giving rise to further embodiments.

If there is multipath propagation, this is preferably incorporated into the singular value decomposition at transmitter side through feedback information. Corresponding information can also be derived through channel reciprocity if the reverse direction channel matrix is determined at transmitter side (the transmitter side also comprising radio receiver). Another solution comprises a self-tuning antenna, optimizing performance at receiver side, transmitter side or both. The antenna element positioning is then adapted to channel propagation properties corresponding to a measured channel matrix, H. This can be achieved by, e.g. a stochastic gradient algorithm. Particularly for fixed positioned antenna elements, they may require the antenna elements to be re-distributed for optimum performance. For an electromechanically adjustable element antenna the optimization can be achieved by automatic position adjustments of the antenna elements. The different solutions to multipath propagation can also be combined.

Preferably and in accordance with the invention, singular value decomposition is applied to flat (frequency non-selective) fading channels. If a channel nevertheless is frequencyselective fading, the channel can be considered piecewise flat fading for sufficiently small frequency intervals. Such piecewise flat fading channels can, e.g., be achieved by dividing a given frequency range or bandwidth using orthogonal-frequencies sub-carriers of sufficiently narrow one or more bandwidths for the one or more bandwidths to be much less than the coherence bandwidth. One technique for achieving such sub-carriers is orthogonal frequency division multiplex, OFDM.

The concept of the present invention combines well with other known means to increase throughput, such as transmission at both vertical and horizontal polarization or transmission at left-hand and right-hand circular polarization, or different coding of different sub-channels depending on their respective channel quality, which further demonstrates the usefulness of the invention. Such combinations are also within the scope of this invention.

Dimensioning has been expressed in relation to particular orientation, e.g. horizontal or vertical orientation, referring to orthogonal directions, perpendicular to the direction of communications. However, this does not exclude rotation of receiver and transmitter antennas in a plane parallel to the antenna elements, with corresponding rotation of both antennas such that their mutual orientation is preserved. Despite somewhat inappropriate, the notation of vertical and horizontal is kept for reasons of simplicity.

The invention is not intended to be limited only to the embodiments described in detail above. Changes and modifications may be made without departing from the invention. It covers all modifications within the scope of the following claims.

The invention claimed is:

1. A method of configuring an antenna, the method comprising:
constructing the antenna to comprise a plurality of antenna elements; and
configuring the antenna for line of sight (LOS) communication such that the separation of the antenna elements is set in relation to $\sqrt{D\lambda/N}$ where D is communications distance, $\lambda$ is communication wavelength and N is number of antenna elements.

2. The method according to claim 1 wherein the antenna configuration maximizes multiple-input multiple-output (MIMO) channel capacity.

3. The method according to claim 1 wherein the antenna is a linear antenna.

4. The method according to claim 1 wherein the antenna is a square grid antenna.

5. The method according to claim 4 wherein $N=n^2$ for n an integer greater than 1.

6. The method according to claim 1 wherein the antenna is a rectangular grid antenna.

7. The method according to claim 6 wherein the dimension of separation is horizontal dimension.

8. The method according to claim 6 wherein the dimension of separation is vertical dimension.

9. The method according to claim 1 wherein for a triangular grid antenna with three antenna elements, the separation of the antenna elements is set in relation to $\sqrt{D\lambda/3}$, where D is communications distance and $\lambda$ is communication wavelength.

10. A method of configuring an antenna, the method comprising:
constructing the antenna to comprise a plurality of clusters of antenna elements; and
configuring the antenna such that the plurality of clusters of antenna elements are separated by a distance set in relation to communications distance and the antenna configuration is three-dimensional.

11. The method according to claim 10 wherein the antenna is configured such that the plurality of clusters of antenna elements are separated by a distance set in relation to communication wavelength.

12. The method according to claim 10 wherein for a linear antenna the plurality of clusters of antenna elements are separated by a distance set in relation to $\sqrt{D\lambda/L}$ where D is communications distance, $\lambda$ is communication wavelength and L is number of clusters.

13. The method according to claim 10 wherein for a square grid antenna the plurality of clusters of antenna elements are separated by a distance set in relation to $\sqrt{D\lambda/\sqrt{L}}$ where D is communications distance, $\lambda$ is communication wavelength and L is number of clusters.

14. The method according to claim 13 wherein $L=I^2$ for I an integer greater than 1.

15. The method according to claim 10 wherein the antenna elements within a cluster are separated by a distance smaller than the smallest distance between clusters.

16. The method according to claim 10 wherein the antenna configuration comprises two layers, where each layer comprises a planar arrangement of antenna elements on a square grid.

17. The method according to claim 10 wherein the antenna configuration comprises antenna elements positioned equidistant in a three-dimensional space.

18. The method according to claim 15 wherein the antenna elements are positioned to vertices of a cube.

19. The method according to claim 15 wherein the antenna elements are positioned to vertices of a tetrahedron.

20. The method according to claim 10 wherein the antenna elements are fed with signals processed according to singular value decomposition for a transmission channel over the communications distance.

21. The method according to claim 20 wherein the transmission channel considered is a flat fading sub-carrier.

22. The method according to claim 20 wherein the transmission channel considered is an OFDM sub-carrier.

23. The method according to claim 10 wherein the signals received from the antenna elements are processed according to zero forcing for a transmission channel over the communications distance.

24. The method according to claim 10 wherein the signals received from the antenna elements are processed to minimize mean square error for a transmission channel over the communications distance.

25. The method according to claim 10 wherein signal processing of signals received or to be transmitted is performed at high-frequency.

26. The method according to claim 25 wherein the processing is performed by one or more 3-dB hybrids.

27. The method according to claim 25 wherein the processing is performed by one or more Butler matrix directional couplers.

28. The method according to claim 25 wherein the processing is performed by an arrangement of microstrip.

29. The method according to claim 25 wherein the processing is performed by an arrangement of waveguides.

30. The method according to claim 29 wherein the antenna configuration is a radio antenna configuration.

31. The method according to claim 29 wherein the antenna configuration is a configuration of sensors or actuators for optical communications.

32. An antenna configuration comprising:
a plurality of antenna elements,
wherein the plurality of antenna elements is configured for line of sight (LOS) communication such that separation of the antenna elements is set in relation to $\sqrt{D\lambda/N}$ where D is communications distance, $\lambda$ is communication wavelength and N is number of antenna elements.

33. The antenna configuration according to claim 32 wherein the antenna configuration maximizes MIMO channel capacity.

34. The antenna configuration according to claim 32 wherein the antenna configuration is a linear antenna configuration.

35. The antenna configuration according to claim 32 wherein the antenna configuration is a square grid antenna configuration.

36. The antenna configuration according to claim 35 wherein $N=n^2$ for n an integer greater than 1.

37. The antenna according to claim 32 wherein the antenna elements separation is set in relation to $\sqrt{D\lambda/N}$ where D is communications distance, $\lambda$ is communication wavelength and N is number of antenna elements in dimension of separation, for a rectangular grid antenna.

38. The antenna according to claim 37 wherein the dimension of separation is a horizontal dimension.

39. The antenna according to claim 37 wherein the dimension of separation is a vertical dimension.

40. The antenna configuration according to claim 32 wherein the antenna elements separation is set in relation to $\sqrt{D\lambda/3}$, where D is communications distance and $\lambda$ is communication wavelength, a triangular grid antenna with three antenna elements.

41. The antenna configuration according to claim 32, the antenna configuration being three-dimensional.

42. The antenna configuration according to claim 32, the antenna configuration comprising two layers, where each layer comprises a planar arrangement of antenna elements on a square grid.

43. The antenna configuration according to claim 32, the antenna configuration comprising antenna elements positioned equidistant in a three-dimensional space.

44. The antenna configuration according to claim 43, the antenna elements being positioned to vertices of a cube.

45. The method according to claim 43, the antenna elements being positioned to vertices of a tetrahedron.

46. An antenna configuration comprising:
a plurality of clusters of antenna elements wherein the antenna elements are configured such that the plurality of clusters of antenna elements are separated by a distance set in relation to communications distance, communication wavelength and number of antenna elements,
constructing the antenna to comprise a plurality of antenna elements; and
configuring the antenna for line of sight (LOS) communication such that the separation of the antenna elements is set in relation to $\sqrt{D\lambda/N}$ where D is communications distance, $\lambda$ is communication wavelength and N is number of antenna elements.

47. The antenna configuration according to claim 46, the plurality of clusters of antenna elements being separated by a distance set in relation to $\sqrt{D\lambda/L}$, where D is communications distance, $\lambda$ is communication wavelength and L is number of clusters, and wherein the antenna configuration is a linear antenna configuration.

48. The antenna configuration according to claim 46, the plurality of clusters of antenna elements being separated by a distance set in relation to $\sqrt{D\lambda}/\sqrt{L}$ where D is communications distance, $\lambda$ is communication wavelength and L is number of clusters and wherein the antenna configuration is a square grid antenna configuration.

49. The antenna configuration according to claim 48, $L=I^2$ for I an integer greater than 1.

50. The antenna configuration according to claim 46, the antenna elements within a cluster are separated by a distance smaller than the smallest distance between the plurality of clusters of antenna elements.

51. The antenna configuration according to claim 46, one or more antenna element feeders being adapted to feed the antenna elements with signals processed according to singular value decomposition for a transmission channel over the communications distance.

52. The antenna configuration according to claim 51, wherein the transmission channel considered is a flat fading sub-carrier.

53. The antenna configuration according to claim 51, wherein the transmission channel considered is an OFDM sub-carrier.

54. The antenna configuration according to claim 46, wherein one or more processing elements are adapted to process signals received from the antenna elements according to zero forcing for a transmission channel over the communications distance.

55. The antenna configuration according to claim 46, wherein one or more processing elements are adapted to process signals received from the antenna elements to minimize mean square error for a transmission channel over the communications distance.

56. The antenna configuration according to claim 46, wherein one or more processing elements are adapted to process at high-frequency signals received or to be transmitted.

57. The antenna configuration according to claim 56, the one or more processing elements being one or more 3-dB hybrids.

58. The antenna configuration according to claim 56, the one or more processing elements being one or more Butler matrix directional couplers.

59. The antenna configuration according to claim 56, the one or more processing elements being an arrangement of microstrip.

60. The antenna configuration according to claim 56, the one or more processing elements being an arrangement of waveguides.

61. The antenna configuration according to claim 46, the antenna elements being electrically active elements.

62. The antenna configuration according to claim 46, the antenna elements being directors.

63. The antenna configuration according to claim 62, the directors being reflectors.

64. The antenna configuration according to claim 46, the antenna elements being arranged symmetrically in a circular pattern.

65. The antenna configuration according to claim 46, the antenna elements being arranged in a hexagonal pattern.

66. The antenna configuration according to claim 46, the antenna elements being mounted on position adjustable rods or wires.

67. The antenna configuration according to claim 66, the position adjustable rods or wires being electromechanically adjustable.

68. The antenna configuration according to claim 67 wherein the adjustable position is adaptive to propagation channel properties corresponding to a measured channel matrix.

69. The antenna configuration according to claim 46, the antenna configuration being adapted to a predetermined range of communications distances.

70. An antenna configuration, the antenna configuration comprising a plurality of antenna elements, of which a subset forms an active set of antenna elements, the active antenna elements forming an antenna configuration that is configured for line of sight (LOS) communication such that separation of the antenna elements is set in relation to communications distance, communication wavelength and number of antenna elements.

71. The antenna configuration according to claim 70, wherein the antenna configuration is a radio antenna configuration.

72. The antenna configuration according to claim 70, wherein the antenna configuration is a configuration of sensors or actuators for optical communications.

73. A communications system comprising:
an antenna having a plurality of antenna elements, wherein the antenna is configured for line of sight (LOS) communication such that separation of the antenna elements are set in relation to $\sqrt{D\lambda/N}$ where D is communications distance, $\lambda$ is communication wavelength and N is number of antenna elements.

74. The communications system according to claim 73 wherein the separation of antenna elements are set different for a first and a second antenna, the two antennas operating in pair, such that the geometrical average of the elements distance of the first, antenna, $d_1$ and the elements distance of the second antenna, $d_2$, is the effective antenna elements distance.

75. The communications system according to claim 73, wherein the antenna is one of a linear antenna, a square grid antenna and a rectangular grid antenna and the separation of the antenna elements is set in relation to $\sqrt{D\lambda/N}$ where D is communications distance, $\lambda$ is communication wavelength and N is number of antenna elements.

76. The communications system according to claim 75 wherein $N=n^2$ for n an integer greater than 1.

* * * * *